United States Patent
Nagy

(10) Patent No.: US 6,823,726 B1
(45) Date of Patent: Nov. 30, 2004

(54) METHOD AND SYSTEM OF SIMULATING A COLD OR HOT START AUTOMOBILE EMISSIONS TEST

(75) Inventor: Donald B. Nagy, Canton, MI (US)

(73) Assignee: General Motors Corporation, Detroit, MI (US)

( * ) Notice: Subject to any disclaimer, the term of this patent is extended or adjusted under 35 U.S.C. 154(b) by 362 days.

(21) Appl. No.: 09/667,208

(22) Filed: Sep. 21, 2000

(51) Int. Cl.[7] ................. G01M 15/00; G01N 17/00
(52) U.S. Cl. .................................. 73/117.3; 73/865.6
(58) Field of Search ............................ 73/865.6, 117.3

(56) References Cited

U.S. PATENT DOCUMENTS

| | | | | |
|---|---|---|---|---|
| 4,300,205 A | * | 11/1981 | Tansuwan ................. 703/8 |
| 4,680,959 A | * | 7/1987 | Henry et al. ............... 73/865.6 |
| 5,769,049 A | * | 6/1998 | Nytomt et al. ............. 73/116 |
| 5,869,743 A | * | 2/1999 | Jones et al. ............... 73/23.31 |
| 5,941,918 A | * | 8/1999 | Blosser ..................... 73/118.1 |
| 5,986,545 A | * | 11/1999 | Sanada et al. ............ 73/865.6 |

FOREIGN PATENT DOCUMENTS

| | | | | |
|---|---|---|---|---|
| DE | 4330122 A1 | * | 3/1994 | ............ G01M/7/08 |
| JP | 5-87696 | * | 5/1991 | .......... G01M/17/00 |

* cited by examiner

*Primary Examiner*—Edward Lefkowitz
*Assistant Examiner*—Maurice Stevens
(74) *Attorney, Agent, or Firm*—Christopher DeVries

(57) ABSTRACT

A method of simulating a cold start automobile emissions test on an automobile is provided. The automobile includes an emissions system. The emissions system includes an engine and at least one catalytic converter. The automobile is preconditioned. A first gaseous substance is injected into the emissions system of the automobile between the engine and the catalytic converter. The first gaseous substance is further injected into the emissions system of the automobile after the catalytic converter. The engine of the automobile is then started. Finally, a second gaseous substance is injected into the emissions system of the automobile.

10 Claims, 2 Drawing Sheets

METHOD AND SYSTEM OF SIMULATING A COLD OR HOT START AUTOMOBILE EMISSIONS TEST

FIELD OF THE INVENTION

The present invention relates to automotive emissions testing, and, more particularly, to a method and system of simulating a cold or hot start automobile emissions test.

BACKGROUND OF THE INVENTION

In today's automotive climate, much attention has been drawn to the amount of emissions from the engines of automobiles. More specifically, there has been a greater push, not only within this country, but generally throughout the world, to reduce the amount of carbon monoxide (CO) and other undesirable emissions released into the atmosphere. A method by which to accurately measure the emissions of an automobile engine has accordingly become extremely important.

Most automakers have developed various ways of testing the emissions output of an automobile. To determine how accurately an emissions test site can measure an automobile's emissions, a classical diagnostic test used in the industry is to run a "cold start" automobile test, using correlation, or test, automobiles. One disadvantage with the "cold start" diagnostic testing technique has been the requirement that the automobile be cooled down to ambient levels after each test, such that another test may be run. This process is known as "soaking" the automobile. Typically, 12–24 hours of cool down time is needed between tests. This time period greatly effects how often these measurements, and correspondingly, the tests can be made. In addition, on low emissions automobiles, the automobile variability is often a significant problem in determining test accuracy.

Accordingly, it would be desirable to have a program and method that overcomes the above disadvantages.

SUMMARY OF THE INVENTION

One aspect of the present invention provides for a method of simulating a cold start automobile emissions test. The automobile includes an emissions system. The emissions system includes an engine and at least one catalytic converter. The automobile is preconditioned. A first gaseous substance is injected into the emissions system of the automobile between the engine and the catalytic converter. The first gaseous substance is further injected into the emissions system of the automobile after the catalytic converter. The engine of the automobile is then started. Finally, a second gaseous substance is injected into the emissions system of the automobile.

Another aspect of the present invention provides for a method of simulating a hot start automobile emissions test on an automobile. The automobile includes an emissions system. The emissions system includes an engine and at least one catalytic converter. The automobile is preconditioned. A first gaseous substance is injected into the emissions system of the automobile between the engine and the catalytic converter. The first gaseous substance is further injected into the emissions system of the automobile after the catalytic converter. The engine of the automobile is then started. A second gaseous substance is then injected into the emissions system of the automobile. Finally, a third gaseous substance is injected into the emission system.

Another aspect of the present invention provides a system for simulating a cold start automobile emissions test on an automobile. The automobile includes an emissions system. The emissions system includes an engine and at least one catalytic converter. A preconditioning means preconditions the automobile. A first injector injects a first gaseous substance into the emissions system of the automobile between the engine and the catalytic converter. A second injector injects the first gaseous substance into the emissions system of the automobile downstream of the catalytic converter. A means for starting the engine of the automobile starts the engine. Finally, a third injector injects a second gaseous substance into the emissions system of the automobile.

Another aspect of the present invention provides a system for simulating a hot start automobile emissions test on an automobile. The automobile includes an emissions system. The emissions system includes an engine and at least one catalytic converter. A preconditioning means preconditions the automobile. A first injector injects a first gaseous substance into the emissions system of the automobile between the engine and the catalytic converter. A second injector injects the first gaseous substance into the emissions system of the automobile downstream of the catalytic converter. A means for starting the engine of the automobile starts the engine. A third injector injects a second gaseous substance into the emissions system of the automobile. Finally, a fourth injector injects a third gaseous substance into the emission system.

DETAILED DESCRIPTION OF THE PRESENTLY PREFERRED EMBODIMENTS

Figure 1:
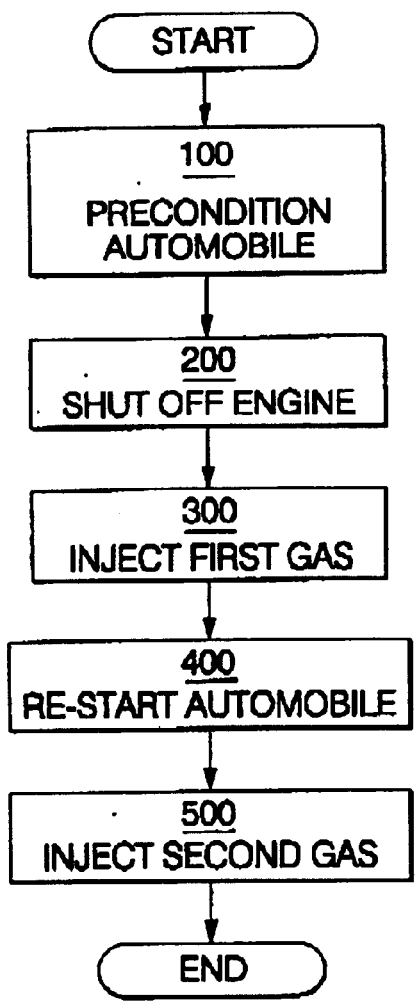
FIG. 1 is a flowchart illustrating one embodiment of a method of simulating a cold start automobile emissions test, made in accordance with the present invention.

One embodiment of the present invention uses a "warmed-up" (or "hot") automobile. The emissions of such an automobile are very low as a result of the heated catalytic converter. A known calibrated gas with high enough concentration, and for a predetermined length of time, is injected into the automobile's exhaust system, at a point located downstream of the catalytic converter, to simulate cold start emission profiles. This calibrated gas is injected by using a computer-controlled mass flow controller, and added to the automobile's normal (but lower) emission gases. Because the synthetic gas can be precisely injected, and because the gas represents a majority of the total measured emissions, a measurement of emissions at this point leads to a more accurate and more repeatable mass emission level. The normal emissions attributed to the engines combustion process are still there, at higher variability, but represent a fraction of the total automobiles exhaust emissions.

Another aspect of the present invention includes an exhaust pipe preconditioning feature. It is currently known that when an automobile is cold started, that because there is no carbon dioxide ($CO_2$) in the tail pipe, large measurement errors may occur. Since the present invention simulates a cold start, there is a desire to duplicate this condition with the correlation automobile simulator. However, running emissions tests back to back, as provided for in the present invention, will leave $CO_2$ gas in the tail pipe system, and therefore will not truly simulate an actual cold start automobile test. Therefore, a key part of the present invention is to precondition the automobile's tail pipe and exhaust collection system by injecting an inert gas to flush out the $CO_2$ from the tail pipe. As a result, the automobile will simulate a true cold start automobile even though the automobile just ran a test and, consequently, has been heated. The flushing takes a short period of time, for example, just a few minutes, between the tests.

Another embodiment of the present invention simulates a "hot start" automobile emission test. In this simulation, the principle is the same, i.e., a known calibration gas is injected into the tail pipe while the automobile is running. However, in this embodiment, the concentration level of the calibration gas is much lower and varies more frequently to simulate the varying exhaust gas composition. Even though the concentration of this gas is much lower, it still is higher than the vehicle's exhaust gases and thereby provides improved accuracy with less variability.

In one embodiment of the present invention, a low emissions automobile is preconditioned. The process of preconditioning an automobile may occur by running the engine of the automobile until the engine of the automobile is thoroughly warmed-up. Alternatively, this process may take place in any manner which allows the engine of the automobile to warm up until low emissions are achieved. The engine of the automobile is then shut off. A first gas is injected into the emissions system of the automobile, both ahead or upstream of and behind or downstream the catalytic converter, to flush out all exhaust gases currently within the system. This process, however, will not significantly cool down the catalytic converter. The engine of the automobile is then restarted, and a high-level calibration gas is simultaneously injected into the emissions system. The injection of this high-level calibration gas will simulate a cold-start condition. Normally, this cold-start emission will take a short time, for example, 20 seconds, in duration for an accurate measurement to occur. After the expiration of this time, the simulator will inject a lower level calibration gas to simulate hot running and a low emissions automobile. This step may take many minutes in duration. Therefore, the simulator will have simulated both a cold-start and hot-start emissions test condition without the present-day requirement of soaking the automobile to return to cold start conditions. Furthermore, any combination of injection location, timing, gas concentrations, gas composition and gas flow rate may be varied to simulate other automobile operating conditions.

The simulator of a preferred embodiment of the present invention results in a lower test variability because the automobile's lower level emission are precisely mixed with known high level calibration gases. As a result, the high variability of the exhaust emissions are averaged with the low variability of the injected gases, thereby providing lower overall variability. In addition, the simulator of the present invention accurately simulates a true cold start automobile test, including proper operation of the dynamometer. The simulator uses the automobile's exhaust gases as a carrier for the injected calibration gas, and includes important physical properties, such as, for example, heat, water, high flow rates and $CO_2$. As a result of the high temperature of the automobile prior to the start of the simulator, the simulator may run repetitive back-to-back tests without the requirement of soaking the automobile. Finally, the simulator may also simulate a hot low-level emissions with lower variability.

Figure 3:
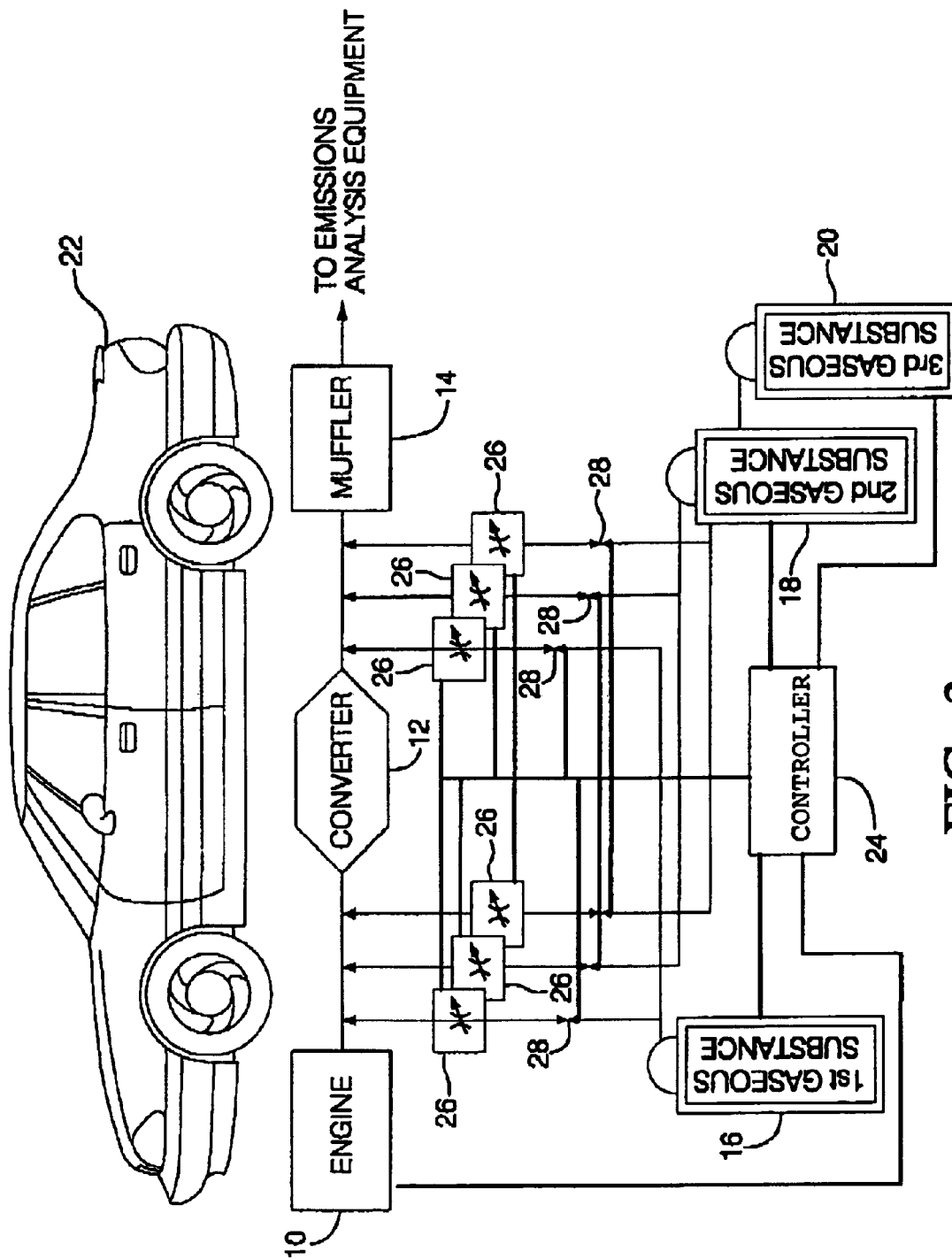
FIG. 3 is a schematic diagram illustrating one embodiment of a system for simulating the automobile emissions tests of FIGS. 1 and 2, made in accordance with the present invention.

Referring to FIGS. 1 and 3, which together illustrate a one embodiment of a system and method for simulating a cold start automobile emissions test. First, an automobile 22 is preconditioned (Block 100). Generally, the process of preconditioning the automobile 22 serves to provide an automobile that is "hot" or "warmed." A hot automobile is an automobile that has been running for a predetermined period of time such that the temperature of the engine 10 is above its normal "resting" temperature. For purposes of the present invention, the resting temperature of the automobile 22 may be, for example, 75° F. The purpose for this preconditioning step is to provide a simulated cold start test that can be applied to warmed automobiles without a required "soak time." The soak time is the period in which a hot automobile 22 must sit in order for the temperature of the engine 10 to return to the temperature of the surrounding air. Currently, this soak time runs anywhere from between 12–24 hours. The present invention thus provides a means for eliminating this time delay, and consequently, allows for repetitive back-to-back test simulations.

In detail, the preconditioning aspect of the present invention is as follows: first, the engine 10 of the automobile 22 is started. The engine 10 may be started by an automated computer controller 24, known in the art, or by any other similar means of igniting the engine 10 of the automobile 22. Second, the engine 10 of the automobile 22 is run for a predetermined period of time until the temperature of the engine 10 has reached a predetermined and stable level and temperature. This process may be performed by any known monitoring method, such as an automated computer controller 24, which monitors the temperature of the engine 10.

At this point, the engine 10 is thoroughly warmed up, and the automobile 22, through the emissions system, is emitting a very low level of emissions. This is because the engine 10 and drivetrain are at a stable warmed-up condition and the catalytic converter 12 is at the required operating temperature to significantly reduce the automobile's exhaust emissions. In late model vehicles, most of the mass emissions normally occur during the first 20 seconds of operation after ignition. Thus, it is necessary, in a cold start test, to have adequate instruments in place to measure this initial 20-second "spike." Furthermore, as is explained below, the present invention must be structured so as to accurately measure this 20-second spike.

After the automobile 22 has been preconditioned, the engine 10 is shut off by the controller 24 (Block 200), and a first gaseous substance 16 is injected into the emissions system of the automobile 22 (Block 300). Preferably, the emissions system of the automobile 22 in the present invention comprises the engine 10 of the automobile 22, at least one catalytic converter 12 and at least one muffler 14. This emissions system is shown in detail in FIG. 3. An emissions system similar to the one described here is generally known in the art, and may further include other elements in addition to those mentioned above.

The first gaseous substance 16 may be initially injected into the missions system of the automobile 22 at two points of the emissions system. First, the first gaseous substance 16 may be injected into the emissions system between the engine 10 and the catalytic converter 12. Second, the first gaseous substance 16 may be injected into the emissions system of the automobile 22 after the catalytic converter 12. As an alternative to the second injection point, the first gaseous substance 16 may be injected between the catalytic converter 12 and the muffler 14. In either case, a greater proportion of the first gaseous substance 16 is injected at the second point of entry (i.e., after the catalytic converter 12 or between the catalytic converter 12 and the muffler 14) than at the first point of entry (i.e., between the engine 10 and the catalytic converter 12). The first gaseous substance 16 preferably comprises a known concentration of dry-treated pure air. Additionally, the first gaseous substance 16 may be warmed. In such a case, however, for purposes of the present invention, the first gaseous substance 16 is, in one embodiment, not as warm as the temperature of the catalytic converter 12. The purpose for injecting the first gaseous substance 16 into the emissions system of the automobile 22 is to flush out the current emissions that may be present within the emissions system. Although this can be done by letting the car "soak," as described above, since the purpose of the present invention is to simulate a cold start emissions test during hot conditions (i.e., when the engine 10 of the automobile 22 is warmed), the injection of the first gaseous substance 16, is used to flush out any present emissions from the emissions system. As a result, the next ignition of the engine 10 will provide a cold start simulation, in spite of the fact that the engine 10 of the automobile 22 is warmed.

The first gaseous substance 16, which may be contained in a pressurized container, is preferably injected into the emission system of the automobile 22 by any known means of flow control, such as, for example, an injector or a plurality of solenoid valves 28. The solenoid valve may be automatically controlled by the present invention through any known means, such as by a computer algorithm, or any other means in which the opening and closing of a valve may be controlled. For purposes of the present invention, the control of each of the solenoid valves 24 is by a plurality of automated flow control devices 26. The automated flow control devices 26 may be controlled by the controller 24.

Thus, the next step in the present invention is to re-start the engine 10 of the automobile 22 (Block 400). The re-ignition of the engine 10 of the automobile 22 may be by the controller 24. As a result of the injection of the first gaseous substance 16, there are no emissions in the emissions system prior to this second start. A second gaseous substance 18 is then injected into the emissions system of the automobile (Block 500). In one embodiment, this second gaseous substance 18 is injected into the emissions system after or downstream of the catalytic converter 12. Alternatively, however, the second gaseous substance 18 may be injected before or upstream of the catalytic converter 12. In any event, the injection of the second gaseous substance 18 into the emissions systems simulates a cold start of the engine 10 of the automobile 22. This simulation occurs due to the makeup of the second gaseous substance 18, along with the spike of emissions caused by the re-ignition of the engine 10 of the automobile 22. The second gaseous substance 18 may be calibrated with a predetermined amount of hydrocarbons (HC) and carbon monoxide (CO). These gases are also represented in the emissions associated with a cold start of an automobile 22, but at varying levels and, in some cases, levels too low to be accurately measured. By injecting a gaseous substance, containing a known (and high) level of these gases, into the emissions system, an accurate reading of these gases may be taken, from which the amount of gases present in the engine 10 of the automobile 22 at re-ignition may be determined by the controller 24. At this point, the simulator is simulating a cold start automobile emissions test. As a result, measurements of the composition of the exhaust air may be accurately taken at any point along the emissions system by the controller 24.

The second gaseous substance 18, which may be contained in a pressurized container, is preferably injected into the emission system of the automobile 22 by any known means of flow control, such as, for example, an injector or a plurality of solenoid valves 28. Preferably, the solenoid valve may be automatically controlled through any known means, such as by a computer algorithm, or any other means in which the opening and closing of a valve may be controlled. In one embodiment, the control of each of the solenoid valves 28 is by a plurality of automated flow control devices 26. The automated flow control devices 26 may be controlled by the controller 24.

Figure 2:
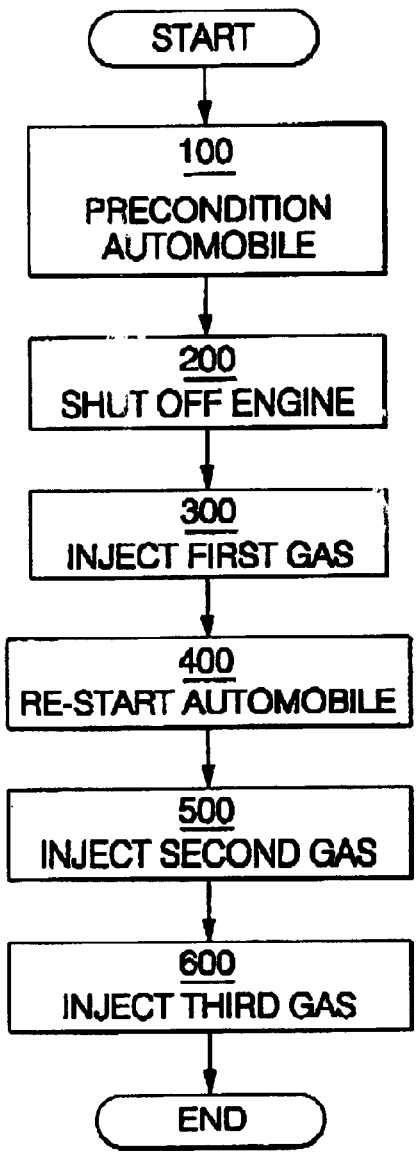
FIG. 2 is a flowchart illustrating one embodiment of a method of simulating a hot start automobile emissions test, made in accordance with the present invention.

FIGS. 2 and 3 illustrate another embodiment of the present invention. Referring to FIGS. 2 and 3, a system and method of simulating a hot start automobile emissions test is provided. In a hot start automobile emissions test, the method is similar to that described above with reference to the cold start emissions test. However, after injecting the second gaseous substance 18 into the emissions system (which, as stated above, provides for a simulated cold start), a third gaseous substance 20 may be injected into the emissions system after a predetermined time period (Block 600). The third gaseous substance 20, like the second gaseous substance 18, may be pre-calibrated to a known concentration of both HC and CO. However, unlike the second gaseous substance 18, the third gaseous substance 20 comprises a lower level of concentration of the two substances. The purpose for this is that, during a hot start emissions test, there is no 20-second spike of emissions as there is during a cold start emissions test. Rather, any emissions during a hot start emissions test would "trickle out" by comparison.

As a result, the existing need to measure this relative "trickle" may be satisfied by a lower concentration of the third gaseous substance 20. The third gaseous substance 20 can then be measured to determine the current amounts of HC and CO in the emissions system of the automobile 22 during a simulated hot start of the engine 10. Thus, at this point, the simulator is simulating a hot start automobile emissions test. As a result, measurements of the composition of the exhaust air may be accurately taken at any point along the emissions system of the automobile 22 by the controller 24.

The third gaseous substance 20, which may be contained in a pressurized container, is preferably injected into the emission system of the automobile 22 by any known means of flow control, such as, for example, an injector or a plurality of solenoid valves 28. Preferably, the solenoid valve may be automatically controlled by the present invention through any known means, such as by a computer algorithm, or any other means in which the opening and closing of a valve may be controlled. In one embodiment, the control of each of the solenoid valves 24 is by a plurality of automated flow control devices 26. The automated flow control devices 26 may be controlled by the controller 24.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

I claim:

1. A method of simulating a cold start automobile emissions test, comprising the steps of:

preconditioning an automobile, the automobile including an emissions system, the emissions system including an engine and at least one catalytic converter;

injecting a first gaseous substance into the emissions system between the engine and each of the catalytic converters;

injecting the first gaseous substance into the emissions system after each of the catalytic converters;

starting the automobile; and injecting a second gaseous substance into the emissions system.

2. The method of claim 1, wherein the preconditioning step comprises the following steps:

starting the automobile;

operating the automobile until the temperature of the automobile has reached a predetermined temperature and a predetermined level of emissions has been achieved; and turning the automobile off.

3. The method of claim 2, wherein the first gaseous substance is heated to a temperature not greater than the predetermined temperature.

4. The method of claim 1, wherein the second gaseous substance is injected into the emissions system after each of the catalytic converters.

5. The method of claim 1, wherein a greater proportion of the first gaseous substance is injected after each of the catalytic converters than is injected between the engine and each of the catalytic converters.

6. The method of claim 1, wherein the emissions system further includes at least one muffler; and further comprising the step of:

injecting the first gaseous substance into the emissions system between each of the catalytic converters and each of the mufflers.

7. The method of claim 1, wherein the first gaseous substance comprises pure air.

8. The method of claim 1, wherein the second gaseous substance comprises hydrocarbons and carbon monoxide.

9. A system for simulating a cold start automobile emissions test, comprising:

preconditioning means that preconditions an automobile, the automobile including an emissions system, the emissions system including an engine and at least one catalytic converter;

first injecting means that injects a first gaseous substance into the emissions system between the engine and each of the catalytic converters;

second injecting means that injects the first gaseous substance into the emissions system after each of the catalytic converters;

starting means that starts the automobile; and third injecting means that injects a second gaseous substance into the emissions system.

10. The system of claim 9, wherein the preconditioning step comprises:

starting means that starts the automobile;

operating means that operates the automobile until the temperature of the automobile has reached a predetermined temperature and a predetermined level of emissions has been achieved; and ending means that turns the automobile off.

* * * * *